Fig 1

3,058,832
SOLUTION TREATMENT
David N. Glew, Sarnia, Ontario, Canada, assignor to The Dow Chemical Company, Midland, Mich., a corporation of Delaware
Filed Sept. 12, 1960, Ser. No. 55,308
16 Claims. (Cl. 99—199)

This invention relates to a method for concentrating aqueous solutions and concomitantly producing relatively pure and free water; more particularly it relates to a process for concentrating aqueous solutions by utilizing a hydrate forming agent as the water remover through the formation of a separable solid hydrate.

It is a principal object of the present invention to provide a new, novel and useful method for achieving aqueous solution concentration and water recovery.

It is an additional object of the present invention to provide a method of removing water from aqueous solutions at readily obtainable temperatures.

Another object of the present invention is to provide a method for concentrating aqueous solutions and recovering useful water therefrom at a cheaper unit power consumption than is needed with either evaporating or freezing procedures.

It is a further object of the present invention to provide a method for concentration of aqueous solutions containing compounds that are sensitive to heat and cold, e.g. natural fruit juices, dilute alcoholic beverages, blood, biological protein solutions, solutions of antibacterial or antibiotic substances derived from fermentation processes, heat sensitive dyestuffs, those solutions that are easily hydrolyzable, and the like, without producing unwanted side effects normally encountered through use of conventional concentration methods utilizing either extremes of heat (evaporation) or cold (freezing).

Still another object of the present invention is to provide a method for separating relatively pure water from a contaminated solution.

Other objects and advantages of the method of the present invention will be apparent from the detailed description presented hereinafter.

In carrying out the process of the present invention, a hydrate forming gas or liquid is contacted with a dilute aqueous solution under suitable conditions of temperature and pressure thereby to form a solid hydrate of said gas or liquid; the resulting solid hydrate is separated from the resulting relatively concentrated solution; the solid hydrate is decomposed by increasing the temperature, decreasing the pressure or by a combination of these to yield the hydrate forming gas or liquid and free water; the hydrate former then is separated from the water and is recycled for subsequent hydrate formation.

Specifically, one exemplification of the process of the present invention involves contacting a dilute orange juice solution with methylene fluoride at a temperature between 17 and 18° C. and at a pressure of about 207 pounds per square inch absolute. After significant quantities of methylene fluoride hydrate as a separable solid had formed, this solid was separated from the resulting relatively concentrated orange juice. The solid, after separation, was heated to 21° C. under 207 pounds per square inch pressure, whereupon the methylene fluoride hydrate decomposed to liquid methylene fluoride and relatively pure liquid water. Thus, there was prepared relatively pure water, a relatively concentrated orange juice, and liquid methylene fluoride suitable for recycling.

The actual process can be carried out in readily available high pressure reactors in a batch-type operation, in an integrated cyclic system, or preferably in a continuous system wherein concentration of a dilute solution and formation of the solid hydrate are carried out on a continuous basis using recycled hydrate former which is continuously regenerated from the hydrate decomposition.

Gaseous and liquid hydrate formers useful in the method of the present invention may be selected from a wide variety of inorganic and organic hydrate forming materials, for example, the inert gases, oxygen, nitrogen, halogens, gaseous inorganic hydrides, saturated and unsaturated aliphatic hydrocarbons, cyclic aliphatic hydrocarbons, halogenated aliphatic hydrocarbons, perhalogenocarbons, gaseous inorganic oxides, and the like.

Solutions which may be concentrated and/or from which water may be released by use of this method are dilute aqueous electrolyte and aqueous nonelectrolyte solutions from which large amounts of water are to be removed. Representative aqueous solutions which can be concentrated by the novel method of the present invention include for example, natural brines, sea water, brackish water, alkali halide salts, mineral acids, milks, monosaccharides, disaccharides, alcohols, glycols, alkanolamines, penicillins and other biologically active fermentation products, amino acids, proteins and the like. This method has little utility for removing small quantities of water from highly concentrated solutions, but is especially useful for extracting water from dilute electrolyte solutions containing from about 1 to about 20 grams salt per 100 grams water; for concentrating easily decomposable valuable solutions of dyestuffs, soluble proteins or biologically active fermentation products at concentrations from about 0.05 to about 10 weight percent; and, for the ambient temperature concentration of fruit juices such as orange juice at concentrations from about 10 to about 40 weight percent; but would be only of little utility for removing the water from an already concentrated solution of magnesium chloride or calcium chloride, for example, from such solutions containing about 30 percent of the solute. In general, the method of the present invention is most useful in concentrating aqueous solutions until the mole fraction of water in the solution is reduced to about 0.8.

This method can also be used to precipitate salts which enjoy only a limited solubility in water, e.g. $NaHCO_3$, $Na_2SO_4 \cdot 10H_2O$, $Na_2B_4O_7 \cdot 10H_2O$, $KClO_3$, $KClO_4$, $$BaCl_2 \cdot 2H_2O$$

and the like wherein the solid gas hydrate might be separated from the precipitated salt using differential flotation or centrifugal separation techniques.

The maximum temperature for the hydrate forming step of the present invention is that temperature above which a separable hydrate cannot be formed in the presence of a water solution. Preferably, a hydrate former will be selected which may be used at or about room temperature, i.e., from about 20° C. to about 25° C. in order that the process may be run at easily attainable temperatures. Of course, other considerations may dictate the selection of a hydrate former for conditions different from this temperature range. For example, temperatures as low as about minus 20° C. and as high as about 35° C. might be utilized. Lower limits of operating temperatures which can be utilized are those temperatures at which ice forms in the aqueous solution being treated. For those materials which are essentially permanent gases at these temperatures and thus are above their critical temperature, the upper operable temperature is limited only by the pressures attainable in a given system.

For those materials that are normally liquids at these temperatures the upper operable temperature is that temperature at which the hydrate equilibrium line for a preselected final solution concentration cuts the hydrate former liquid line. This is shown for the hydrate former $H_2S$, in the system illustrated in FIGURE 1.

The actual operating conditions for a given system are based on the pressure-temperature equilibrium line data for a given hydrate former as predetermined and calculated for a desired solution concentration, operating temperature and pressure limit utilizing the formula:

$$p_{1t°} = \left(\frac{p_0}{x^n}\right)_{t°}$$

where:

$t°$ = preselected temperature of operation for formation of the solid hydrate and the concentrated aqueous solution.

$p_1$ = minimum absolute pressure of the hydrate former to be exerted at temperature $t°$ to achieve the desired final concentration of the aqueous solution through solid hydrate formation.

$p_0$ = absolute pressure of the hydrate former to be exerted at temperature $t°$ to achieve formation of solid hydrate with pure water. (Assumes water is saturated with hydrate former, but contains substantially no other solute.)

$x$ = mole fraction of water at desired final concentration of the concentrated aqueous solution.

$n$ = number of water molecules associated with one molecule of hydrate former in the solid gas hydrate.

The values of $p_0$ at a preselected $t°$ can be obtained from experimental and published data. Table I, which follows, lists sources which present experimentally determined pressure-temperature equilibrium line data for a number of useful hydrate formers in water.

TABLE I

*Pressure-Temperature Equilibrium Line Data for Hydrate Formers and Water*

| Hydrate Former | Reference |
| --- | --- |
| $CO_2$ | Wroblewski, Compt. rend. 94, 212, 954 (1882). |
| $H_2S$ | de Forcrand, Compt. rend. 94, 967 (1882). |
| $PH_3$, $H_2S$ | Cailletet and Bordet, Compt. rend. 95, 58 (1882). |
| $Cl_2$, $Br_2$, $SO_2$ | Roozeboom, Rec. trav. chim. 3, 54 (1884); 4, 65 (1885). |
| $CH_3Cl$ | Villard and de Forcrand, Compt. rend. 106, 1357, 1402 (1882). |
| $CH_4$, $C_2H_6$, $C_2H_4$ | Villard, Compt. rend. 106, 1602 (1882). |
| $N_2O$ | Villard, Compt. rend. 118, 646 (1894). |
| $C_2H_2$ | Villard, Compt. rend. 120, 1262 (1895). |
| A, Kr | de Forcrand, Compt. rend. 176, 355 (1923). |
| Xe | de Forcrand, Compt. rend. 181, 15 (1925). |
| $CH_4$, $C_2H_6$, $C_3H_8$, $CO_2$ | Deaton and Frost, U.S. Bur. Mines Monograph 8 (1946). |
| $CH_3Br$, $CH_3SH$, $CH_3I$, $C_2H_5Cl$, $CH_2Cl_2$, $CHCl_3$, $CCl_4$. | von Stackelberg, Naturwiss. 36, 327, 359 (1949). |
| $C_2H_4$ | Diepen and Scheffer, Rec. trav. chim. 69, 593 (1950). |
| $H_2S$ | Selleck, Carmichael and Sage, Ind. Eng. Chem. 44, 2219 (1950). |
| $CHCl_2F$ | Banks, Heston and Blankenship, J. Phys. Chem. 58, 962 (1954). |
| $CBrClF_2$ | Glew, Can. J. Chem. 38, 208 (1960). |
| $N_2$ | Van Cleeff and Diepen, Rec. trav. chim. 79, 582 (1960). |

The number of molecules of water ($n$) which will be bound to or with one molecule of the individual hydrate formers is either about 5.75, 7.66 or 17, this quantity depending directly on the molar volume of the hydrate former. Those materials wherein the liquid molar volumes, at the normal boiling point of the material, will be from about 30 to about 50 cubic centimeters/gram mole will have 5.75 moles of water per mole of the material; materials exhibiting liquid molar volumes of between 50 to 55 cubic centimeters/gram mole at the normal boiling point will combine with 7.66 moles of water per mole of the hydrate former; those materials having a liquid molar volume of from about 60 to about 100 cubic centimeters/gram mole of the substance will exhibit a hydrate stoichiometry of 17 moles water per mole of the material.

Examples of representative molecular species classified according to their hydrate stoichiometry are shown in Table II wherein M represents any of the individual hydrate forming molecules shown within a given section.

TABLE II

| Hydrate Formula | Hydrate Former, M |
| --- | --- |
| M. 5.75 $H_2O$ | A, Kr, $N_2$, $O_2$, $Cl_2$, $H_2S$, $H_2Se$, $CO_2$, $N_2O$, $PH_3$, $AsH_3$, $CH_3F$, $CH_3Cl$, $CH_4$. |
| M. 5.75 $H_2O$ or M. 7.66 $H_2O$ | $SO_2$, $CH_2F_2$, $C_2H_2$, $C_2H_4$. |
| M. 7.66 $H_2O$ | Xe, $Br_2$, $NF_3$, $CHF_3$, $CF_4$, $CH_3Br$, $C_2H_5F$, $CH_3CHF_2$, $C_2H_6$. |
| M. 17 $H_2O$ | $CH_2Cl_2$, $CHCl_3$, $CCl_4$, $CH_3I$, $C_2H_5Cl$, $CH_3CF_3$, $CH_3CHCl_2$, $CHBrF_2$, $CClF_3$, $CCl_2F_2$, $CCl_3F$, $CBr_2F_2$, $CBrClF_2$, $CF_3I$, $C_3H_6$, $C_3H_8$, cyclo $C_5H_{10}$. |

Although ordinarily the formula will be utilized to determine the operating pressure ($p_1$) for a preselected temperature ($t°$), known pressure ($p_0$) of formation of solid hydrate with pure water and for a desired final solution concentration as represented by the residual mole fraction of water ($x$) in the solution, generally it is to be understood that if any two of the operating variables, i.e., $p_1$, $p_0$ and $x$ at a preselected $t°$ are known, the third can be found by calculation using the formula.

Figure 1:
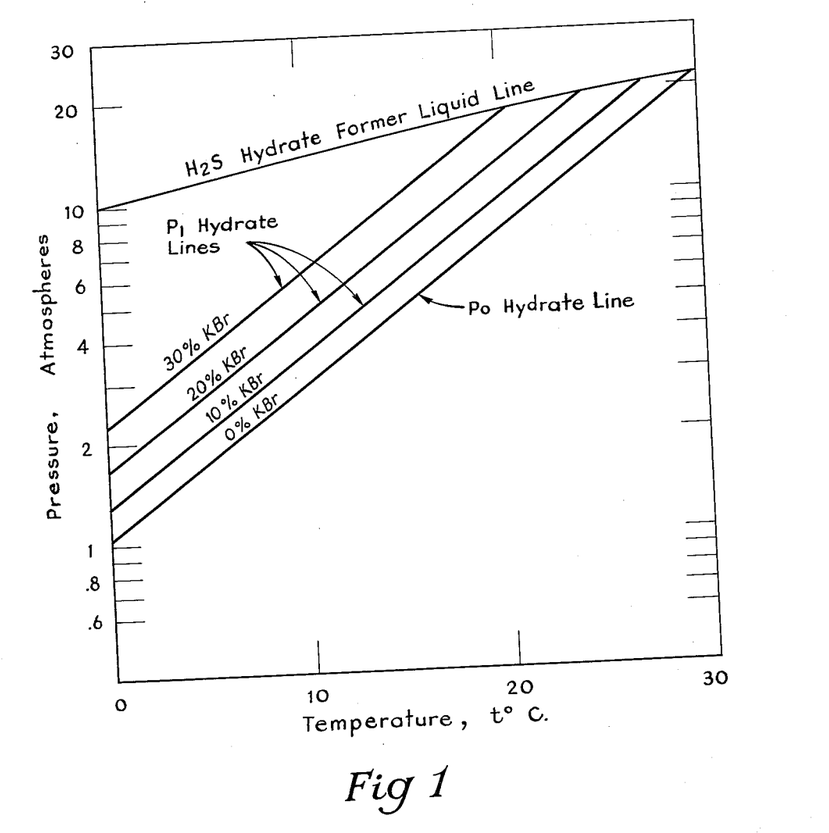

To illustrate further the use of the formula, operating conditions which can be used for concentrating a dilute solution of potassium bromide to varying degrees using hydrogen sulfide as the hydrate former are shown as follows:

(1) It is desired to prepare a final solution concentration of 10 percent KBr, equivalent to 0.967 mole fraction water ($x$) at a preselected temperature of operation of 10° C. ($t°$). The number of water molecules associated with hydrate former, $H_2S$, is 5.75 ($n$) and the absolute pressure in atmospheres of the hydrate former at 10° C. in pure water is 3.0 ($p_0$), as shown in FIGURE 1 plotted from the data of Selleck, Carmichael and Sage (Table I).

Substituting these values in the formula gives the following expression:

$$p_{1_{10°C}} \text{ (atmos.)} = \left(\frac{3.0}{(0.967)^{5.75}}\right)_{10°C.}$$

$$p_{1_{10°C}} \text{ (atmos.)} = 3.6$$

Therefore, the pressure to be exerted on the system at 10° C. to obtain a desired final concentration of 10 percent KBr is 3.6 atmopheres.

(2) Assuming it is desired to determine the final solution concentration which would be obtained at an operating temperature ($t°$) of 20° C., utilizing an operating pressure ($p_1$) of about 12.8 atmospheres; then from the $p_0$ line shown in FIGURE 1, $p_0$ at 20° is about 8.4 atmospheres. Substituting the values for $p_1$ and $p_0$ in the formula and rearranging to solve for ($x$) shows that the final solution concentration obtained under these operating conditions would be about 20 percent KBr.

(3) Additionally, assuming a final desired solution concentration of 30 percent KBr, equivalent to 0.885 mole fraction water ($x$), at an operating temperature of about 10° C., at which temperature the $p_0$ of $H_2S$ is about 3.0 atmospheres, it can be found by substituting these values in the formula that an operating pressure ($p_1$) of 6.1 atmospheres would be needed.

Furthermore, in conventional commercial operation where pressure and temperature control are not exact, the hydrate pressure-temperature equilibrium line for a concentrated solution ($p_1$—operating pressure for hydrate formation in concentrated solution) can be taken as parallel to the hydrate pressure-temperature equilibrium line for water ($p_0$—pressure for hydrate formation in water), since differences of non-ideality which cause deviations from the parallel condition are small compared with the effect of pressure and temperature control fluctuations. This means that from the determination of $p_1$ or for a preselected $p_1$, at a single temperature within the operable range of a given hydrate former one can draw hydrate pressure-temperature equilibrium lines parallel to the hydrate pressure-temperature equilibrium line for water for each of a number of corresponding final solution concentrations and thereby establish the operating pressures needed for a given solution concentration at any desired operating temperature.

FIGURE 1 is presented to further illustrate the hydrate pressure-temperature equilibrium line relationships for several aqueous potassium bromide solution concentrations (10, 20 and 30 percent by weight) as calculated hereinbefore using hydrogen sulfide as the hydrate former.

From this exemplary FIGURE 1, it can be seen that the instant method of hydrate formation and its counterpart, the regeneration of the hydrate former and release of water can be carried out isothermally, isopiestically, or by any combination of the two techniques.

It is to be understood that in order to increase the rate of both solid hydrate formation and the concurrent solution concentration, hydrate former pressures superior to the final $p_1$ may be used provided that the quantity of hydrate former is limited only to that amount needed to just achieve the desired solution concentration ($x$). With such limitation upon the hydrate former, the superior hydrate former pressure decreases to $p_1$ as this final solution concentration ($x$) is attained. To illustrate, to a natural sea water containing about 3.45 weight percent salts liquid methyl chloride is added in an amount sufficient to give a final salt solution containing 4.85 weight percent salts with concurrent formation of the solid methyl chloride hydrate. The hydrate former reaction is run at a pressure of about 64.5 pounds per square inch absolute, for example ($p_1$ for this final solution concentration with methyl chloride hydrate former is 56 pounds per square inch absolute). At the end of the hydrate forming reaction, the pressure in the reactor dropped from 64.5 pounds per square inch absolute to 56 pounds per square inch absolute.

The actual separation of the so-produced solid hydrate from the concentrated solution can be made utilizing conventional techniques of centrifugation, filtration, differential flotation and the like while maintaining suitable pressure, temperature and concentration conditions to assure existence of the solid hydrate.

Regeneration of the hydrate former from the solid hydrate, after separation of the hydrate from the concentrated solution, is readily accomplished by increasing the vapor pressure of the hydrate relative to the atmosphere surrounding said hydrate to a point such that decomposition of the hydrate occurs. In practical operation, this regeneration of the hydrate former is carried out directly in the reactor system. After separating the solid hydrate from a resultant concentrated solution, the solution can be removed from a given reactor system at the reaction temperature and pressure. The resulting solid hydrate product remaining in the system then is decomposed by (1) lowering the pressure of the reactor below that point at which the hydrate is stable, (2) increasing the temperature above that at which the hydrate is stable, or (3) by a combination of these. To illustrate, the hydrate former, $H_2S$, can be regenerated from the solid hydrogen sulfide hydrate, resulting from concentration of the dilute KBr solution up to 10 percent KBr by weight, as shown hereinbefore by (1) increasing the reactor temperature several degrees, i.e., to 12–14° C. or higher while maintaining the pressure constant at 3.6 atmospheres, (2) lowering the reactor pressure to 2.9 atmospheres or below while maintaining the temperature at 10° C., (3) simultaneously lowering the reactor pressure to at least 2.0 atmospheres and decreasing the reactor temperature to not less than 7° C. or (4) simultaneously increasing the reactor pressure to 5 atmospheres and increasing the reactor temperature to not less than 17° C.

The concentration of the resulting aqueous solution will vary on a percentage basis from solute to solute but generally in commercial operation this concentration will be such that the mole fraction of water in the concentrated aqueous solutions is decreased to about 0.8. The practical utility of the process can be shown by the following examples: a solution of orange juice can be concentrated from about 10 to about 38 weight percent sucrose; 0.1 weight percent benzyl penicillin in aqueous solution can be concentrated to give a solute content of about 11.1 weight percent; ethylene glycol (3 weight percent in water) can be concentrated to about 15 weight percent; sea water containing about 3.45 weight percent salts can be concentrated to about 19 weight percent salts content; consommé containing about 3 percent by weight protein can be concentrated to contain about 10 weight percent protein.

The resulting relatively concentrated aqueous solution as prepared will be saturated with residual hydrate former. In many cases, because of the nature of the solution and hydrate former, and the intended use of the concentrated solution the small amount of hydrate former dissolved in the solution presents no problem. However, if it is desired to remove the hydrate former from the solution this can be carried out effectively using conventional stripping and scrubbing techniques.

It is apparent that the selection of a given hydrate former for use with a specific solution will be made on the basis of nonreactivity between the solute of the solution and the hydrate former. Furthermore, it is to be understood, for example, that non-toxic, completely strippable hydrate formers will be utilized with those solutions which ultimately are designed for human consumption or use.

The following examples will serve to further illustrate the process of the present invention without limiting it thereto.

EXAMPLE 1

Natural gas, of composition $CH_4=72.1$, $CO_2=0.2$, $C_2H_6=13.7$, $C_3H_8=10.8$, and $C_4^+=3.7$ percentage by volume, was maintained at a pressure of about 1510 pounds per square inch absolute pressure and at a temperature of about 18.5° C. in a pressure reactor vessel in the presence of a stirred dilute salt solution containing about 3.45 grams salts per 100 grams water (nominal salts content of seat water). Under these conditions, the formation of natural-gas hydrate takes place with heat evolution until the salt solution attains a concentration of about 18.9 grams salts per 100 grams water. The concentrated salt solution was then separated from the gas hydrate by filtration at the reaction temperature and pressure conditions and removed from the reactor, the natural-gas hydrate remaining therein. The substantially solution free solid gas hydrate was washed with a small amount of water and then heated to about 24.3° C. at 1510 pounds per square inch whereupon decomposition of the hydrate occurred regenerating the natural gas and water. The natural gas was transferred to a second reactor at the stated pressure and used there to treat a new, fresh batch of dilute salt water at 18.5° C. as described above. The free water obtained was removed from the first reactor, decompressed and stripped of dissolved natural gas. Similarly the concentrated salt solution after decompression also was stripped of dissolved natural gas. These fractions of natural gas then were collected, recompressed and recycled to the second reactor vessel as well.

EXAMPLE 2

A sea water of 19.00 percent chlorinity containing 3.45 weight percent salts was treated at about 12.5° C. with nitrogen at about 1000 atmospheres absolute pressure. After nitrogen hydrate formation had taken place under these conditions, the salt solution concentration reached about 14.9 weight percent salts. The concentrated solution was filtered from the nitrogen hydrate which remained in the reactor and the hydrate was washed with salt-free water at 12.5° C. The hydrate-containing reactor was then heated to between 19 and 20° C. where nitrogen gas was evolved at 1000 atmospheres pressure releasing water. The nitrogen was transferred to another reactor at 12.5° C. and 1000 atmospheres pressure in which the sea water concentration cycle was taking place.

EXAMPLE 3

A sea water of 19.00 percent chlorinity containing 3.45 weight percent salts was treated at about 10° C. with nitrogen at about 780 atmospheres pressure. Hydrate formation under these conditions gave a concentrated salt solution containing about 14.9 weight percent salts. The concentrated solution was filtered under pressure, and the nitrogen hydrate was washed with salt-free water at 10° C. A compressor removed the nitrogen gas at 450 atmospheres pressure and recompressed the gas to 780 atmospheres pressure whence it was transferred to a further reactor undergoing the concentration cycle at 10° C. The water released from hydrate decomposition was run from the reactor thereby readying it for a further concentration cycle.

EXAMPLE 4

To a natural sea water, of 19 percent chlorinity containing 3.45 weight percent dissolved salts, at 17° C. sufficient liquid methyl chloride was added to the solution to increase its concentration to 4.85 weight percent salts after formation of methyl chloride hydrate. The mixture was seeded by pumping a small quantity of methyl chloride hydrate sludge into the reactor, and the two-phase liquid methyl chloride-water mixture was stirred to obtain rapid equilibration. At the end of the hydrate forming reaction the methyl chloride pressure in the reactor dropped from 64.5 pounds per square inch absolute to 56 pounds per square inch absolute, the methyl chloride hydrate was separated from the concentrated 4.85 weight percent solution and washed with a little salt-free water. The concentrated solution was then stripped of dissolved methyl chloride which was recompressed and returned to the system. The washed methyl chloride hydrate was then heated in the reactor to 23° C. where it decomposed to liquid methyl chloride and water at 78 pounds per square inch absolute. The water was run from the reactor, stripped of dissolved methyl chloride, which was recompressed and added to the system. The methyl chloride liquid in the reactor was cooled to 17° C. for a further concentration cycle.

EXAMPLE 5

Natural sea water of 19.0 percent chlorinity containing 3.45 weight percent salts in water was subjected to liquid ethane at 475 pounds per square inch absolute pressure at 55° F. under hydrate forming conditions. The ethane gas hydrate formed in the salt solution until the salt concentration reached about 5.18 weight percent salts. The concentrated salt solution was run from the pressure vessel leaving the solid ethane hydrate to which some concentrated salt solution adhered. The 5.18 weight percent salt solution was decompressed and stripped of dissolved ethane which was recompressed and returned to the system. The ethane hydrate remaining in the reactor was washed with a minimum amount of water at 55° F. until the pressure had dropped to about 375 pounds per square inch absolute; the water washings were run from the reactor and stripped of ethane, this gas then being recompressed and recycled. The salt-free ethane hydrate was then heated to 59–60° F. where it decomposed to liquid ethane and water at about 495 pounds per square inch absolute pressure with absorption of heat. The water was then run from the bottom of the reactor and stripped of ethane which was recompressed and recycled. The ethane in the reactor was then cooled to 55° F. and fresh dilute 3.45 weight percent salt solution admitted for further concentration. The process so described removed and separated 34.6 percent of the water present in natural sea water.

In a comparative study, utilizing this process at 57–58° F. with ethane at 485 pounds per square inch absolute pressure resulted in no solid ethane hydrate formation nor solution concentration of the natural sea water.

EXAMPLE 6

To a natural sea water of 19.0 percent chlorinity containing 3.45 weight percent salts sufficient liquid methylene fluoride was added at 14° C. and 188 pounds per square inch absolute to increase the salt concentration to 9.4 weight percent salts after methylene fluoride hydrate formation. Hydrate formation was initiated by the use of a stainless steel cold finger at minus 5° C. after which the liquid mixture was continually agitated to accelerate methylene fluoride hydrate formation at 14° C. The concentrated sea water was run from the hydrate in the vessel, stripped of dissolved methylene fluoride and transferred to storage. The methylene fluoride hydrate was washed with water, the washings being combined with the natural sea water. The hydrate was decomposed at 21° C. and 226 pounds per square inch absolute to liquid water and liquid methylene fluoride; the liquid methylene fluoride was separated from the water and transferred to storage for reuse. The water produced was stripped of dissolved gaseous methylene fluoride which was then recompressed and returned to the system.

EXAMPLE 7

Natural gas, of composition $CH_4$ 72.1, $CO_2$ 0.2, $C_2H_6$ 13.7, $C_3H_8$ 10.8 and $i-C_4H_{10}$ 3.2 percentage by volume, was maintained at a pressure of about 1510 pounds per square inch absolute pressure and at a temperature of about 18.5° C. in a pressure reactor vessel in the presence of a stirred dilute potassium bromide solution containing about 9.2 grams potassium bromide per 100 grams water. Under these conditions, the formation of natural-gas hydrate takes place with heat evolution until the potassium bromide solution attains a concentration of about 38.6 grams salt per 100 grams water. The concentrated potassium bromide solution was then separated from the solid gas hydrate by filtration at the reaction temperature and pressure conditions and removed from the reactor, the natural-gas hydrate remaining therein. The substantially solution free solid gas hydrate was washed with a small amount of water and then heated to about 24.3° C. at 1510 pounds per square inch absolute whereupon decomposition of the hydrate occurred, regenerating the natural gas and water. The natural gas was transferred to a second reactor at the stated pressure and used there to treat a new, fresh batch of dilute potassium bromide solution at 18.5° C. as described above. The free water obtained was removed from the first reactor, decompressed and stripped of dissolved natural gas. Similarly, the concentrated potassium bromide solution after decompression, was also stripped of dissolved natural gas. These fractions of natural gas then were collected, recompressed and recycled to the second reactor vessel as well.

EXAMPLE 8

Utilizing a dilute potassium bromide solution and natural-gas hydrate former as described in Example 7, concentration of the potassium bromide solution and formation of the natural-gas hydrate was carried out at a temperature of about 18.5° C. and at a pressure of about 1510 pounds per square inch absolute in the first reactor. The concentrated potassium bromide solution prepared in the first reactor was filtered from the reactor chamber after which the pressure therein was reduced to about 800 pounds per square inch absolute whereupon the solid gas hydrate remaining in the reactor decomposed with heat absorption at 18.5° C. This heat loss was balanced from heat evolved in potassium bromide solution concentration stage being carried out simultaneously in the second reactor. The resulting natural gas at about 800 pounds per square inch absolute and at about 18.5° C. was passed from the first reactor through a compressor, therein being recompressed to about 1510 pounds per square inch absolute. The so-compressed gas was transferred to the second reactor where it took part in the isothermal salt concentration stage and subsequent solution removal and hydrate decomposition. The first reactor was then charged with fresh dilute potassium bromide solution and the natural gas which now had been discharged from the second reactor and again repressurized to about 1510 pounds per square inch, was again admitted to the first reaction to carry out another concentration cycle.

EXAMPLE 9

An aqueous hydrochloric acid solution containing about 4 percent of hydrogen chloride by weight was treated with liquid chlorine at about 20° C. and 96.8 pounds per square inch absolute pressure in a pressurized reaction vessel. The acid and chlorine were stirred in the vessel whereupon the solid chlorine hydrate formed and the aqueous acid concentration increased to about 11.6 percent hydrogen chloride by weight.

The concentrated acid was separated from the hydrate by filtration, removed from the reactor and stripped of dissolved chlorine.

The chlorine hydrate remaining in the reactor was water washed at about 20° C. until the pressure reduced to about 48 pounds per square inch absolute.

The temperature in the reactor was then further reduced to about 8° C. and the vessel pressure decreased to about 26.5 pounds per square inch absolute whereupon decomposition of the solid chlorine hydrate to gaseous chlorine and liquid water took place with heat absorption.

This absorption of heat upon decomposition was exchanged with the heat evolved during hydrate formation from a second reactor (as described in Example 8) wherein a concentration cycle was being carried out.

The water so produced was stripped of chlorine. The regenerated chlorine gas at about 26.8 pounds per square inch absolute was liquified upon compression to about 96.8 pounds per square inch absolute, the liquid transferred to the second concentration reactor for further hydrate formation.

EXAMPLE 10

A 10 weight percent aqueous lithium sulfate solution was treated at about 10° C. and about 212 pounds per square inch absolute in a pressure vessel with gaseous phosphine in the presence of a liquid perchloroethylene phase. Formation of the solid phosphine hydrate and concentration of the aqueous solution continued until the lithium sulfate solution attained saturation at about 26 weight percent of solute. Further treatment with additional phosphine led to formation of more solid phosphine hydrate and precipitation of solid lithium sulfate monohydrate.

The solid lithium sulfate monohydrate was separated from the phosphine hydrate by differential flotation in the liquid perchloroethylene phase (density 1.6 g./cc.) on the surface of which the phosphine hydrate (density 1.2 g./cc.) floated and through which the lithium sulfate monohydrate (density 2.1 g./cc.) sank.

The lithium sulfate monohydrate and liquid perchloroethylene were run from the reactor, and the perchloroethylene was filtered from the damp, solid lithium sulfate monohydrate.

The small amount of concentrated aqueous solution remaining in the reactor was filtered, at reaction conditions, from the phosphine hydrate which was left in the reactor. The filtered perchloroethylene and concentrated aqueous solution were combined without removal of dissolved phsophine and the mixture transferred to a second reactor whereupon it took part in another concentration cycle. The damp, solid lithium sulfate monohydrate was stripped of phosphine, perchloroethylene and water thereby yielding the dry salt.

The solid phosphine hydrate remaining in the reactor was water washed at about 10° C. until its pressure decreased to about 85 pounds per square inch absolute. The reactor temperature was then heated to about 19° C., the pressure reaching about 218 pounds per square inch absolute at which point the hydrate decomposed to water and gaseous phosphine. The gaseous phosphine, as formed, was transferred to a second concentration reactor. At completion of decomposition, the water was removed from the first reactor, thereby readying this vessel for a further concentration cycle.

This method is particularly useful for production of the solid lithium sulfate monohydrate, since this salt which has a negative solubility coefficient with respect to temperature cannot be recrystallized by the usual methods. Recrystallization by evaporation of water from the solution, can be used but is expensive.

EXAMPLE 11

Cream is first removed from milk to give skimmed milk of composition 3.11 weight percent protein (casein) 4.75 weight percent sugar (lactobiose) and 0.74 weight percent salts. Skimmed milk is treated at about 10° C. with sterilized air at 490–495 atmospheres absolute pressure whereupon the oxygen-nitrogen gas hydrate forms and the milk is concentrated up to a composition of 6.22 weight percent protein, 4.75 weight percent sugar and 1.48 weight percent salts. The gas hydrate and concentrated skimmed milk are separated, the hydrate remaining in the pressure vessel. The hydrate is then decomposed at about 11.2–11.5° C., regenerating the air at 495 atmospheres pressure. The gas is reused to concentrate further skimmed milk at 10° C. Dissolved gas loss is made up by additional sterile air at 495 atmospheres. The concentrated skimmed milk is stripped of excess air. If desired the cream is then returned to the concentrated skimmed milk which product in turn may be diluted with its own volume of water thereby giving regular full cream milk.

EXAMPLE 12

Grape juice containing 12 to 15 weight percent sugars is treated with liquid $CO_2$ at 45.5° F. and 610 pounds per square inch absolute and maintained under these conditions after seeding with a small quantity of carbon dioxide hydrate. The liquid mixture is stirred to maintain good contact and heat is removed until the juice attains a 27 weight percent concentration of sugars. The concentrated juice is filtered from the reactor in which the carbon dioxide hydrate remains; the dissolved carbon dioxide is stripped from the concentrated juice which is run to storage. The carbon dioxide hydrate in the reactor is washed with a little water until the sugar content of the wash water is reduced to about 10 weight percent sugar; this solution is then run from the hydrate reactor and combined with the dilute juice in storage. The hydrate is then heated to above 50° F. to decompose the hydrate to liquid carbon dioxide and water and the water is run from the reactor which now contains the liquid carbon dioxide at about 650 pounds per square inch absolute. The water is stripped of carbon dioxide which is returned to the system. The reactor containing liquid carbon dioxide is now cooled to 45.5° F. and fresh, dilute 12–15 percent juice added for a further concentration cycle.

EXAMPLE 13

An approximately 10 weight percent (weight of sucrose solute on water weight) aqueous fruit juice solution (orange juice) was contacted in a pressure reactor with methylene fluoride at about 17–18° C. and about 207 pounds per square inch absolute with continuous agitation. The reactor temperature was maintained at about 17–18° C. by use of an external water cooling circuit.

The exothermic reaction, during which solid methylene fluoride hydrate was formed, was continued until about 80 percent of the water had been removed from the juice as the solid hydrate and the juice had attained a solute content of about 38 percent by weight on the weight of water.

The concentrated juice was then filtered from the reactor, decompressed and after stripping the small quantity of methylene fluoride remaining therein, was transferred to storage.

The solid hydrate remaining in the reactor was decomposed by raising the temperature to 21° C. The regenerated methylene fluoride was recycled for further reaction with more juice. The water so produced was separated and discarded after decompression and stripping methylene fluoride therefrom.

The methylene fluoride recovered from the juice and stripped from the water was added to that obtained in the hydrate decomposition for use in further concentration.

EXAMPLE 14

A dilute ethyl alcohol solution in water containing about 10 weight percent alcohol is treated in a pressure reactor with liquid nitrous oxide at 6.5° C. and at about 36 atmospheres pressure. The reaction mixture is stirred and cooled to 6.5° C. until the formation of solid nitrous oxide hydrate is complete and the alcoholic solution has reached a final concentration of about 20.5 weight percent ethyl alcohol. The concentrated alcoholic solution is run from the reactor in which the solid nitrous oxide hydrate remains. The concentrated solution is stripped of dissolved nitrous oxide which is recompressed and returned to the system, the solution being taken to storage. The solid hydrate is washed at 6.5° C. with a small quantity of water to remove adhering alcohol, the washing water run off and combined with the dilute 10 percent alcohol. The remaining hydrate is then decomposed at 12.5° C. and 41–42 atmospheres pressure to give liquid nitrous oxide and liquid water. The water is run from the reactor and stripped of dissolved nitrous oxide which is recompressed and returned to the system. The liquid nitrous oxide in the reactor is then cooled to 6.5° C. for the concentration of further 10 weight percent ethyl alcohol in water.

EXAMPLE 15

An aqueous solution of ethylene glycol (3 percent solute by weight) was added to liquid hydrogen sulfide in a pressure reactor, maintained at about 25° C. and 290 pounds per square inch absolute pressure. Hydrate formation was induced by seeding, with the heat generated during the reaction being removed by cooling water to maintain the reactor temperature at 25° C. The solid hydrogen sulfide hydrate formed and the aqueous solution was concentrated to about 14.8 weight percent ethylene glycol.

The concentrated glycol solution was filtered from the reactor and stripped of dissolved hydrogen sulfide.

The solid hydrogen sulfide hydrate remaining in the reactor was washed with a small amount of water at 25° C., during which operation the gas pressure reduced to about 210 pounds per square inch absolute.

The temperature of the reactor was then raised to about 30° C., the pressure rising to about 330 pounds per square inch absolute, whereupon the liquid hydrogen sulfide was regenerated and water produced. The water was removed from the reactor, then decompressed and stripped of dissolved hydrogen sulfide.

The reactor, containing the liquid hydrogen sulfide was cooled to about 25° C. and a fresh batch of dilute aqueous ethylene glycol introduced for further concentration.

EXAMPLE 16

An initial 0.1 weight percent benzyl penicillin solution is treated with xenon at not less than 120 pounds per square inch absolute pressure and 20° C. to form xenon hydrate until the solution concentration of the penicillin reaches about 0.5 weight percent. The xenon hydrate is separated from the penicillin solution and decomposed by raising the temperature thereby to liberate water and xenon. The 0.5 weight percent benzyl penicillin solution is further subjected to a gaseous xenon pressure of not less than 122 pounds per square inch absolute pressure at 20° C. until hydrate formation increases the penicillin concentration to about 2.44 weight percent. The hydrate is separated and decomposed in the same manner as before. The 2.44 weight percent benzyl penicillin solution is finally subjected to xenon at not less than 124 pounds per square inch absolute pressure at 20° C. until the solution reaches about 11.1 weight percent penicillin, equivalent to 99.2 percent of water removal, the hydrate separated and decomposed. The 11.1 percent benzyl penicillin solution is then freeze-dried to remove the small amount of water remaining. The hydrate dehydration removes 99.2 percent of the water from the 0.1 percent solution at lower cost than the freeze drying process, and the freeze drying removes the residual 0.8 percent water, yielding the solid benzyl penicillin, the overall cost of dehydration being reduced to about ⅓ of the same dehydration by freeze drying alone.

EXAMPLE 17

Utilizing a combination isothermal and isopiestic method and the reactor system as described in Example 7, an aqueous solution of diethanolamine (2.4 percent solute by weight) was contacted and stirred with liquid propane at about 2.8° C. and about 74.4 pounds per square inch absolute pressure (saturation pressure).

The solid propane hydrate formed and the solution concentration increased to 14.8 weight percent diethanolamine. The solution was separated from the solid hydrate by filtering at about 2.8° C. and 74.4 pounds per square inch. The resulting separated concentrated aqueous solution was then stripped of dissolved propane.

The solid hydrate was washed with a small amount of water, and then decomposed into liquid water and liquid propane by heating to about 5.7° C., the pressure rising to about 81 pounds per square inch absolute.

The water from decomposition of the hydrate was removed from the bottom of the reactor and was stripped of gaseous propane.

The recovered liquid and gaseous propane was introduced into a second reactor as described in Example 7, and reutilized as above.

EXAMPLE 18

Consommé containing about 3 percent by weight of protein was treated with gaseous krypton at about 1000 p.s.i.a. at 15° C. after seeding with a krypton hydrate preparation. The krypton pressure was maintained at about 1000 p.s.i.a. until the consommé concentration had been increased to about 4.5 weight percent protein through water removal by the krypton as krypton hydrate. The concentrated consommé was separated from the solid hydrate remaining in the pressure vessel and was stripped of dissolved krypton and thence transferred to storage for further concentration. The solid krypton hydrate was washed with water until the washings concentration reached about 3 weight percent protein. The washings were then separated from the hydrate and combined with the bulk of the 3 weight percent consommé. The krypton hydrate in the reactor was then heated to 17° C. where its pressure increased to 1065 pounds per square inch absolute. This gas was then decompressed to 1000 pounds per square inch absolute for further treatment of the 3 weight percent consommé at 17° C.

The 4.5 weight percent concentrated consommé may be further concentrated in two hydrate concentration stages to 6.75 and 10 weight percent protein solutions; the 10 weight percent solution being the final concentrated consommé which may be diluted with twice its own volume of water to give the regular consommé.

EXAMPLE 19

An approximately 5 weight percent aqueous solution of DL-alanine was treated with a gaseous mixture of 20 mole percent methane and 80 mole percent ethylene at about 880 pounds per square inch absolute and 60° F. Hydrate formation of the mixed methane-ethylene hydrate was initiated by seeding, and the gas mixture was continuously introduced until the DL-alanine concentration in the solution reached about 13.7 weight percent, its saturation point. The concentrated DL-alanine solution was run from the reactor, stripped of dissolved gases and taken to storage. The hydrate was washed with water until the washings contained about 5 weight percent DL-alanine and the washings were combined with the dilute DL-alanine in storage. The washed methane-ethylene gas hydrate was then heated and decomposed at 65–66° F. to maintain a gas pressure of about 880 pounds per square inch absolute. The gases were transferred, as formed, to another reactor at 60° F. in which concentration was taking place. After hydrate decomposition, the water was run from the reactor and stripped of dissolved gases, which were recompressed and added to the system.

Various modifications can be made in the process of the present invention without departing from the spirit and scope thereof, for it is understood that I limit myself only as defined in the appended claims.

I claim:

1. A process for concentrating aqueous solutions and recovering water therefrom which comprises; (1) contacting a dilute aqueous solution with a hydrate forming material in a reactor system, said hydrate forming material being a member selected from the group consisting of hydrate forming gases and hydrate forming liquids, said contacting being carried out at a preselected temperature $t°$ and hydrate former pressure which is not less than $p_1$ in accordance with the formula, $$p_{1t°} = \left(\frac{p_0}{x^n}\right)_{t°}$$

whereby said hydrate forming material forms a solid hydrate with water from said aqueous solution, and where $t°$ is a preselected temperature of operation for formation of the solid hydrate and the concentrated aqueous solution, said temperature $t°$ being selected to be within the range wherein the maximum temperature is that above which the corresponding solid hydrate cannot be formed in the presence of said aqueous solution and the minimum temperature is that where ice forms in said aqueous solution being treated, $p_1$ is the minimum absolute pressure of the hydrate former to be exerted at temperature $t°$ to achieve the desired final concentration of the aqueous solution, $p_0$ is the absolute pressure of the hydrate former solution to be exerted at temperatures $t°$ to achieve formation of solid hydrate with pure water, $x$ is the mole fraction of water at desired final concentration of the concentrated aqueous solution, and $n$ is the number of water molecules associated with said hydrate former in the solid hydrate and where for said preselected temperature $t°$ one of the two variables $x$ and $p_1$ also is preselected whereby the other of said variables $x$ and $p_1$ which was not preselected thereby is determined by said formula, (2) separating the resulting concentrated aqueous solution from said solid hydrate, (3) decomposing said solid hydrate by increasing the vapor pressure of said hydrate relative to the atmosphere surrounding said hydrate to a point such that decomposition of said hydrate occurs thereby regenerating said hydrate forming material, and (4) separating said water from said hydrate forming material.

2. A process for concentrating aqueous solutions and recovering water therefrom which comprises; (1) contacting an aqueous solution with a hydrate forming material in a pressurized reactor system, said hydrate forming material being a member selected from the group consisting of hydrate forming gases and hydrate forming liquids, said aqueous solution having a mole fraction water content, $x$, of from about 0.8 up to about 1.0, said hydrate forming material being a member selected from the group consisting of gas and liquid forming solid hydrates, said contacting being carried out at a predetermined temperature $t°$, of less than about 35° C. and above the freezing point of ice in said solution and at a predetermined elevated pressure, $p_1$, whereby the solid hydrate of said hydrate material is formed with water from said aqueous solution in accordance with the relationship $$p_{1t°} = \left(\frac{p_0}{x^n}\right)_{t°}$$

where $p_0$ is the absolute pressure of the hydrate former exerted at temperature $t°$ to achieve formation of said solid hydrate in pure water and $n$ is the number of water molecules associated with said hydrate former in said solid hydrate, (2) separating the resulting concentrated aqueous solution from said solid hydrate, (3) raising said temperature while maintaining said predetermined pressure thereby decomposing said solid hydrate and regenerating said hydrate forming material and water, and, (5) separating said hydrate forming material and water.

3. The process as defined in claim 2 wherein the solid hydrate is decomposed after separating the concentrated aqueous solution therefrom by reducing the pressure of the reactor while maintaining isothermal conditions in the pressurized reactor system.

4. The process as defined in claim 2 wherein the regenerated hydrate forming material is recycled to contact a fresh batch of dilute aqueous solution.

5. The process as defined in claim 2 wherein the solution concentration and solid hydrate formation, and, the hydrate decomposition are carried out simultaneously in an integrated cyclic system employing two reactors.

6. The process as defined in claim 2 wherein the solution concentration and solid hydrate formation, and, the hydrate decomposition are carried out on a continuous basis.

7. The process as defined in claim 2 wherein the dilute aqueous solution is an electrolyte.

8. The process as defined in claim 2 wherein the dilute aqueous solution is a nonelectrolyte.

9. A process for concentrating natural sea water recovering water therefrom which comprises: (1) contacting water therefrom which comprises: (1) contacting natural sea water with a hydrate forming material in a reactor system, said hydrate forming material being a member selected from the group consisting of hydrate forming gases and hydrate forming liquids, said contacting being carried out at a preselected temperature $t°$ and hydrate former pressure which is not less than $p_1$ in accordance with the formula $$p_{1t°} = \left(\frac{p_0}{x^n}\right)_{t°}$$

whereby said hydrate forming material forms a solid hydrate with water from said sea water, and where $t°$ is a preselected temperature of operation for formation of the solid hydrate and a concentrated aqueous salt solution, said temperature $t°$ being selected to be within the range wherein the maximum temperature is that about which the corresponding solid hydrate cannot be formed in the presence of said aqueous solution and the minimum temperature is that where ice forms in said aqueous solution being treated, $p_1$ is the minimum absolute pressure of the hydrate former to be exerted at temperature $t°$ to achieve the desired final concentration of the aqueous salt solution, $p_0$ is the absolute pressure of the hydrate former to be exerted at temperature $t°$ to achieve formation of solid hydrate with pure water, $x$ is the mole fraction of water at desired final concentration of the concentrated aqueous salt solution, and $n$ is the number of water molecules associated with said hydrate former in the solid gas hydrate and where for said preselected temperature $t°$ one of the two variables $x$ and $p_1$ also is preselected whereby the other of said variables $x$ and $p_1$ which was not preselected thereby is determined by said formula, (2) separating the resulting concentrated aqueous salt solution from said solid hydrate, (3) decomposing said solid hydrate by increasing the vapor pressure of said hydrate relative to the atmosphere surrounding said hydrate to a point such that decomposition of said hydrate occurs thereby regenerating said hydrate forming material, and (4) separating said water from said hydrate forming material.

10. A process for concentrating dilute aqueous fruit juice solutions and recovering water therefrom which comprises: (1) contacting a dilute aqueous fruit juice solution with a hydrate forming material in a reactor system, said hydrate forming material being a member selected from the group consisting of hydrate forming gases and hydrate forming liquids, said contacting being carried out at a preselected temperature $t°$ and hydrate former pressure which is not less than $p_1$ in accordance with the formula $$p_{1t°} = \left(\frac{p_0}{x^n}\right)_{t°}$$

whereby said hydrate forming material forms a solid hydrate with water from said aqueous fruit juice solution, and where $t°$ is a preselected temperature of operation for formation of the solid hydrate and the concentrated aqueous fruit juice solution, said temperature $t°$ being selected to be within the range wherein the maximum temperature is that above which the corresponding solid hydrate cannot be formed in the presence of said aqueous solution and the minimum temperature is that where ice forms in said aqueous solution being treated, $p_1$ is the minimum absolute pressure of the hydrate former to be exerted at temperature $t°$ to achieve the desired final concentration of the aqueous fruit juice solution, $p_0$ is the absolute pressure of the hydrate former to be exerted at temperature $t°$ to achieve formation of solid hydrate with pure water, $x$ is the mole fraction of water at desired final concentration of the concentrated aqueous fruit juice solution, and $n$ is the number of water molecules associated with said hydrate and where for said preselected temperature $t°$ one of the two variables $x$ and $p_1$ also is preselected whereby the other of said variables $x$ and $p_1$ which was not preselected thereby is determined by said formula, (2) separating the resulting concentrated aqueous fruit juice solution from said solid hydrate, (3) decomposing said solid hydrate by increasing the vapor pressure of said hydrate relative to the atmosphere surrounding said hydrate to a point such that decomposition of said hydrate occurs thereby regenerating said hydrate forming material, and (4) separating said water from said hydrate forming material.

11. A process for concentrating dilute aqueous alcohol solutions and recovering water therefrom which comprises: (1) contacting a dilute aqueous alcohol solution with a hydrate forming material in a reactor system, said hydrate forming material being a member selected from the group consisting of hydrate forming gases and hydrate forming liquids, said contacting being carried out at a preselected temperature $t°$ and hydrate former pressure which is not less than $p_1$ in accordance with the formula $$p_{1t°} = \left(\frac{p_0}{x^n}\right)_{t°}$$

whereby said hydrate forming material forms a solid hydrate with water from said aqueous alcohol solution, and where $t°$ is a preselected temperature of operation for formation of the solid hydrate and the concentrated aqueous alcohol solution, said temperature $t°$ being selected to be within the range wherein the maximum temperature is that above which the corresponding solid hydrate cannot be formed in the presence of said aqueous solution and the minimum temperature is that where ice forms in said aqueous solution being treated, $p_1$ is the minimum absolute pressure of the hydrate former to be exerted at temperature $t°$ to achieve the desired final concentration of the aqueous alcohol solution, $p_0$ is the absolute pressure of the hydrate former to be exerted at temperature $t°$ to achieve formation of solid hydrate with pure water, $x$ is the mole fraction of water at desired final concentration of the concentrated aqueous alcohol solution, and $n$ is the number of water molecules associated with said hydrate former in the solid gas hydrate and where said preselected temperature $t°$ one of the two variables $x$ and $p_1$ also is preselected whereby the other of said variables $x$ and $p_1$ which was not preselected thereby is determined by said formula, (2) separating the resulting concentrated aqueous alcohol solution from said solid hydrate, (3) decomposing said solid hydrate by increasing the vapor pressure of said hydrate relative to the atmosphere surrounding said hydrate to a point such that decomposition of said hydrate occurs thereby regenerating said hydrate forming material, and (4) separating said water from said hydrate forming material.

12. A process for concentrating dilute aqueous glycol solutions and recovering water therefrom which comprises: (1) contacting a dilute aqueous glycol solution with a hydrate forming material in a reactor system, said hydrate forming material being a member selected from the group consisting of hydrate forming gases and hydrate forming liquids, said contacting being carried out at a preselected temperature $t°$ and hydrate former pressure which is not less than $p_1$ in accordance with the formula $$p_{1t°} = \left(\frac{p_0}{x^n}\right)_{t°}$$

whereby said hydrate forming material forms a solid hydrate with water from said aqueous glycol solution, and where $t°$ is a preselected temperature of operation for formation of the solid hydrate and the concentrated aqueous glycol solution, said temperature $t°$ being selected to be within the range wherein the maximum temperature is that above which the corresponding solid hydrate cannot be formed in the presence of said aqueous solution and the minimum temperature is that where ice forms in said aqueous solution being treated, $p_1$ is the minimum absolute pressure of the hydrate former to be exerted at temperature $t°$ to achieve the desired final concentration of the aqueous glycol solution, $p_0$ is the absolute pressure of the hydrate former to be exerted at temperature $t°$ to achieve formation of solid hydrate with pure water, $x$ is the mole fraction of water at desired final concentration of the concentrated aqueous glycol solution, and $n$ is the number of water molecules associated with said hydrate former in the solid gas hydrate and where for said preselected temperature $t°$ one of the two variables $x$ and $p_1$ also is preselected whereby the other of said variables $x$ and $p_1$ which was not preselected thereby is determined by said formula, (2) separating the resulting concentrated aqueous glycol solution from said solid hydrate, (3) decomposing said solid hydrate by increasing the vapor pressure of said hydrate relative to the atmosphere surrounding said hydrate to a point such that decomposition of said hydrate occurs thereby regenerating said hydrate forming material, and (4) separating said water from said hydrate forming material.

13. A process for concentrating dilute aqueous alkanolamine solutions and recovering water therefrom which comprises: (1) contacting a dilute aqueous alkanolamine solution with a hydrate forming material in a reactor system, said hydrate forming material being a member selected from the group consisting of hydrate forming gases and hydrate forming liquids, said contacting being carried out at a preselected temperature $t°$ and hydrate former pressure which is not less than $p_1$ in accordance with the formula $$p_{1t°} = \left(\frac{p_0}{x^n}\right)_{t°}$$

whereby said hydrate forming material forms a solid hydrate with water from said aqueous alkanolamine solution, and where $t°$ is a preselected temperature of operation for formation of the solid hydrate and the concentrated aqueous alkanolamine solution, said temperature $t°$ being selected to be within the range wherein the maximum temperature is that above which the corresponding solid hydrate cannot be formed in the presence of said aqueous solution and the minimum temperature is that where ice forms in said aqueous solution being treated, $p_1$ is the minimum absolute pressure of the hydrate former to be exerted at temperature $t°$ to achieve the desired final concentration of the aqueous alkanolamine solution, $p_0$ is the absolute pressure of the hydrate former to be exerted at temperature $t°$ to achieve formation of solid hydrate with pure water, $x$ is the mole fraction of water at desired final concentration of the concentrated aqueous alkanolamine solution, and $n$ is the number of water molecules associated with said hydrate former in the solid gas hydrate and where for said preselected temperature $t°$ one of the two variables $x$ and $p_1$ also is preselected whereby the other of said variables $x$ and $p_1$ which was not preselected thereby is determined by said formula, (2) separating the resulting concentrated aqueous alkanolamine solution from said solid hydrate, (3) decomposing said solid hydrate by increasing the vapor pressure of said hydrate relative to the atmosphere surrounding said hydrate to a point such that decomposition of said hydrate occurs thereby regenerating said hydrate forming material, and (4) separating said water from said hydrate forming material.

14. A process for concentrating dilute aqueous penicillin solutions and recovering water therefrom which comprises: (1) contacting a dilute aqueous penicillin solution with a hydrate forming material in a reactor system, said hydrate forming material being a member selected from the group consisting of hydrate forming gases and hydrate forming liquids, said contacting being carried out at a preselected temperature $t°$ and hydrate former pressure which is not less than $p_1$ in accordance with the formula $$p_{1t}° = \left(\frac{p_0}{x^n}\right)_{t°}$$

whereby said hydrate forming material forms a solid hydrate with water from said aqueous penicillin solution, and where $t°$ is a preselected temperature of operation for formation of the solid hydrate and the concentrated aqueous penicillin solution, said temperature $t°$ being selected to be within the range wherein the maximum temperature is that above which the corresponding solid hydrate cannot be formed in the presence of said aqueous solution and the minimum temperature is that where ice forms in said aqueous solution being treated, $p_1$ is the minimum absolute pressure of the hydrate former to be exerted at temperature $t°$ to achieve the desired final concentration of the aqueous penicillin solution, $p_0$ is the absolute pressure of the hydrate former to be exerted at temperature $t°$ to achieve formation of solid hydrate with pure water, $x$ is the mole fraction of water at desired final concentration of the concentrated aqueous penicillin solution, and $n$ is the number of water molecules associated with said hydrate and where for said preselected temperature $t°$ one of the two variables $x$ and $p_1$ also is preselected whereby the other of said variables $x$ and $p_1$ which was not preselected thereby is determined by said formula former in the solid gas hydrate, (2) separating the resulting concentrated aqueous penicillin solution from said solid hydrate, (3) decomposing said solid hydrate by increasing the vapor pressure of said hydrate relative to the atmosphere surrounding said hydrate to a point such that decomposition of said hydrate occurs thereby regenerating said hydrate forming material, and (4) separating said water from said hydrate forming material.

15. A process for concentrating dilute aqueous amino acid solutions and recovering water therefrom which comprises: (1) contacting a dilute aqueous amino acid solution with a hydrate forming material in a reactor system, said hydrate forming material being a member selected from the group consisting of hydrate forming gases and hydrate forming liquids, said contacting being carried out at a preselected temperature $t°$ and hydrate former pressure which is not less than $p_1$ in accordance with the formula $$p_{1t}° = \left(\frac{p_0}{x^n}\right)_{t°}$$

whereby said hydrate forming material forms a solid hydrate with water from said aqueous amino acid solution, and where $t°$ is a preselected temperature of operation for formation of the solid hydrate and the concentrated aqueous amino acid solution, said temperature $t°$ being selected to be within the range wherein the maximum temperature is that above which the corresponding solid hydrate cannot be formed in the presence of said aqueous solution and the minimum temperature is that where ice forms in said aqueous solution being treated, $p_1$ is the minimum absolute pressure of the hydrate former to be exerted at temperature $t°$ to achieve the desired final concentration of the aqueous amino acid solution, $p_0$ is the absolute pressure of the hydrate former to be exerted at temperature $t°$ to achieve formation of solid hydrate with pure water, $x$ is the mole fraction of water at desired final concentration of the concentrated aqueous amino acid solution, and $n$ is the number of water molecules associated with said hydrate and where for said preselected temperature $t°$ one of the two variables $x$ and $p_1$ also is preselected whereby the other of said variables $x$ and $p_1$ which was not preselected thereby is determined by said formula former in the solid gas hydrate, (2) separating the resulting concentrated aqueous amino acid solution from said solid hydrate, (3) decomposing said solid hydrate by increasing the vapor pressure of said hydrate relative to the atmosphere surrounding said hydrate to a point such that decomposition of said hydrate occurs thereby regenerating said hydrate forming material, and (4) separating said water from said hydrate forming material.

16. A process for concentrating dilute aqueous protein solutions and recovering water therefrom which comprises: (1) contacting a dilute aqueous protein solution with a hydrate forming material in a reactor system, said hydrate forming material being a member selected from the group consisting of hydrate forming gases and hydrate forming liquids, said contacting being carried out at a preselected temperature $t°$ and hydrate former pressure which is not less than $p_1$ in accordance with the formula $$p_{1t}° = \left(\frac{p_0}{x^n}\right)_{t°}$$

whereby said hydrate forming material forms a solid hydrate with water from said aqueous protein solution, and where $t°$ is a preselected temperature of operation for formation of the solid hydrate and the concentrated aqueous protein solution, said temperature $t°$ being selected to be within the range wherein the maximum temperature is that above which the corresponding solid hydrate cannot be formed in the presence of said aqueous solution and the minimum temperature is that where ice forms in said aqueous solution being treated, $p_1$ is the minimum absolute pressure of the hydrate former to be exerted at temperature $t°$ to achieve the desired final concentration of the aqueous protein solution, $p_0$ is the absolute pressure of the hydrate former to be exerted at temperature $t°$ to achieve formation of solid hydrate with pure water, $x$ is the mole fraction of water at desired final concentration of the concentrated aqueous protein solution, and $n$ is the number of water molecules associated with said hydrate former in the solid gas hydrate and where for said preselected temperature $t°$ one of the variables $x$ and $p_1$ also is preselected whereby the other of said variables $x$ and $p_1$ which was not preselected thereby is determined by said formula, (2) separating the resulting concentrated aqueous protein solution from said solid hydrate, (3) decomposing said solid hydrate by increasing the vapor pressure of said hydrate relative to the atmosphere surrounding said hydrate to a point such that decomposition of said hydrate occurs thereby regenerating said hydrate forming material, and (4) separating said water from said hydrate forming material.

References Cited in the file of this patent

UNITED STATES PATENTS

| | | |
|---|---|---|
| 2,904,511 | Donath | Sept. 15, 1959 |
| 2,974,102 | Williams | Mar. 7, 1961 |